United States Patent
Hulteen et al.

(10) Patent No.: US 10,597,867 B2
(45) Date of Patent: Mar. 24, 2020

(54) SMOKE AND SOUND BARRIER FOR A BUILDING JOINT SYSTEM

(71) Applicant: 3M INNOVATIVE PROPERTIES COMPANY, St. Paul, MN (US)

(72) Inventors: John C. Hulteen, Afton, MN (US); George W. Frost, Afton, MN (US); Richard J. Haffner, New Richmond, WI (US); Ernst L. Schmidt, Hager City, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/564,764

(22) PCT Filed: Apr. 12, 2016

(86) PCT No.: PCT/US2016/027080
§ 371 (c)(1),
(2) Date: Oct. 6, 2017

(87) PCT Pub. No.: WO2016/168169
PCT Pub. Date: Oct. 20, 2016

(65) Prior Publication Data
US 2018/0112392 A1 Apr. 26, 2018

Related U.S. Application Data

(60) Provisional application No. 62/149,101, filed on Apr. 17, 2015.

(51) Int. Cl.
*E04B 1/68* (2006.01)
*B32B 27/08* (2006.01)
(Continued)

(52) U.S. Cl.
CPC .............. *E04B 1/6803* (2013.01); *B32B 7/12* (2013.01); *B32B 15/08* (2013.01); *B32B 25/04* (2013.01);
(Continued)

(58) Field of Classification Search
CPC ..... E04B 1/6801; E04B 1/6803; E04B 1/6804
See application file for complete search history.

(56) References Cited

U.S. PATENT DOCUMENTS 3,292,330 A * 12/1966 Tennison .............. E04B 1/6803
49/495.1
3,786,604 A * 1/1974 Kramer ................. E04B 1/6801
52/232
(Continued)

FOREIGN PATENT DOCUMENTS

AT 309752 B * 9/1973 ........... E04B 1/6803
AT 313540 B * 2/1974 ........... E04B 1/6803
(Continued)

OTHER PUBLICATIONS

International Search Report for PCT International Application No. PCT/US2016/027080, dated Jul. 20, 2016, 3 pages.

*Primary Examiner* — Babajide A Demuren
(74) *Attorney, Agent, or Firm* — Julie Lapos-Kuchar

(57) ABSTRACT

Described herein is a smoke and sound barrier construction for building joint systems and method thereof, wherein an optional packing material and a non-porous adhesive article are used in a building joint.

20 Claims, 1 Drawing Sheet

(51) Int. Cl.
*B32B 15/08* (2006.01)
*B32B 27/28* (2006.01)
*B32B 27/30* (2006.01)
*B32B 7/12* (2006.01)
*B32B 27/40* (2006.01)
*B32B 25/04* (2006.01)
*B32B 27/10* (2006.01)
*B32B 27/12* (2006.01)
*B32B 27/06* (2006.01)
*B32B 27/38* (2006.01)
*E04B 1/84* (2006.01)
*E04B 1/94* (2006.01)

(52) U.S. Cl.
CPC ............ *B32B 27/065* (2013.01); *B32B 27/08* (2013.01); *B32B 27/10* (2013.01); *B32B 27/12* (2013.01); *B32B 27/283* (2013.01); *B32B 27/308* (2013.01); *B32B 27/38* (2013.01); *B32B 27/40* (2013.01); *E04B 1/6801* (2013.01); *E04B 1/6815* (2013.01); *E04B 1/84* (2013.01); *E04B 1/947* (2013.01); *B32B 2307/102* (2013.01); *B32B 2307/724* (2013.01); *B32B 2405/00* (2013.01); *B32B 2419/00* (2013.01); *B32B 2556/00* (2013.01)

(56) References Cited

U.S. PATENT DOCUMENTS

| | | | |
|---|---|---|---|
| 4,058,947 A * | 11/1977 | Earle | E04B 1/948 52/396.01 |
| 4,329,384 A | 5/1982 | Vesley | |
| 4,330,590 A | 5/1982 | Vesley | |
| 4,848,044 A * | 7/1989 | LaRoche | E04B 1/6804 404/68 |
| 5,374,477 A | 12/1994 | Lawless et al. | |
| 5,765,332 A | 6/1998 | Landin | |
| 5,974,750 A | 11/1999 | Landin | |
| 6,441,092 B1 | 8/2002 | Gieselman | |
| 6,449,913 B1 * | 9/2002 | Shelton | B32B 3/16 52/390 |
| 6,955,017 B2 * | 10/2005 | Hilburn | E04B 1/948 52/396.04 |
| 6,996,944 B2 * | 2/2006 | Shaw | E04B 1/948 52/1 |
| 7,070,653 B2 * | 7/2006 | Frost | C09K 21/14 118/300 |
| 7,240,905 B1 | 7/2007 | Stahl, Sr. | |
| 8,024,902 B2 * | 9/2011 | Wedi | E04B 1/6815 52/393 |
| 8,178,177 B2 | 5/2012 | Frost | |
| 8,490,338 B2 | 7/2013 | Longo | |
| 8,590,272 B2 | 11/2013 | Thomas | |
| 9,010,044 B2 * | 4/2015 | Bennett | B32B 21/06 52/177 |
| 9,562,174 B2 | 2/2017 | Russell | |
| 9,850,407 B2 * | 12/2017 | Moyer, Jr. | C09J 131/04 |
| 2002/0081924 A1 | 6/2002 | Fensel | |
| 2004/0137185 A1 | 7/2004 | Sieber et al. | |
| 2004/0137813 A1 | 7/2004 | Faucher | |
| 2004/0219853 A1 | 11/2004 | Weir | |
| 2005/0034389 A1 | 2/2005 | Boot | |
| 2009/0145539 A1* | 6/2009 | Kreckel | A47G 1/175 156/247 |
| 2010/0227103 A1* | 9/2010 | Hohmann, Jr. | E04D 12/002 428/41.8 |
| 2011/0113709 A1 | 5/2011 | Pilz | |
| 2012/0085063 A1 | 4/2012 | Pufahl | |
| 2013/0283715 A1* | 10/2013 | Bennett | B32B 21/06 52/408 |
| 2013/0318911 A1 | 12/2013 | Sealock | |
| 2014/0008086 A1 | 1/2014 | Foerg | |
| 2014/0127443 A1* | 5/2014 | Zhou | C09J 7/21 428/41.8 |
| 2015/0135619 A1* | 5/2015 | Noonan | E04B 1/7604 52/309.9 |
| 2015/0135622 A1* | 5/2015 | Muenzenberger | E04B 1/948 52/407.1 |
| 2015/0184036 A1* | 7/2015 | Zhou | C09J 7/21 428/41.8 |
| 2015/0267016 A1 | 9/2015 | Humiston | |
| 2015/0275050 A1* | 10/2015 | Wei-Cheng | C09J 7/22 428/354 |
| 2017/0183863 A1* | 6/2017 | Foerg | E04B 1/6803 |

FOREIGN PATENT DOCUMENTS

| | | | | | |
|---|---|---|---|---|---|
| AT | 327273 | B | * | 1/1976 | ............ E01D 19/06 |
| AT | 328686 | B | * | 4/1976 | ............ E04B 1/6804 |
| CA | 2258241 | A1 | * | 7/1999 | ............ E04B 1/6801 |
| CA | 2544830 | A1 | * | 5/2005 | ............ E04B 1/6804 |
| CH | 682246 | A5 | * | 8/1993 | ............ E04B 1/6804 |
| DE | 2243088 | | | 3/1974 | ............ E01C 11/123 |
| DE | 2421825 | A1 | * | 11/1975 | ............ E04B 1/6803 |
| DE | 3903567 | A1 | * | 9/1989 | ............ E04B 1/6803 |
| DE | 9111869 | U1 | * | 11/1991 | ............ E04B 1/6804 |
| DE | 4336379 | A1 | * | 12/1995 | ............... E01C 5/08 |
| DE | 10223688 | | | 12/2003 | |
| EP | 0347865 | A1 | * | 12/1989 | ............ E04B 1/6804 |
| EP | 2186957 | A1 | * | 5/2010 | ............ E04B 1/6801 |
| GB | 2472402 | | | 2/2011 | |
| GB | 2522934 | | | 8/2015 | |
| JP | H07-042271 | | | 2/1995 | |
| WO | WO 94/20055 | | | 9/1994 | |
| WO | WO 1996-026332 | | | 8/1996 | |
| WO | WO 2003/038206 | | | 5/2003 | |
| WO | WO 2009-099459 | | | 8/2009 | |
| WO | WO 2015-155201 | | | 10/2015 | |
| WO | WO-2016126673 | A1 | * | 8/2016 | ............ E04B 1/6803 |
| WO | WO 2016-167937 | | | 10/2016 | |
| WO | WO 2016/167938 | | | 10/2016 | |
| WO | WO 2016/167956 | | | 10/2016 | |

* cited by examiner

SMOKE AND SOUND BARRIER FOR A BUILDING JOINT SYSTEM

CROSS-REFERENCE TO RELATED APPLICATIONS

This application is a national stage filing under 35 U.S.C. 371 of PCT/US2016/027080, filed Apr. 12, 2016, which claims the benefit of U.S. Application No. 62/149,101, filed Apr. 17, 2015,the disclosure of which is incorporated by reference in its/their entirety herein.

TECHNICAL FIELD

A smoke and sound barrier for a joint system is described comprising an adhesive article and an optional packing material.

BACKGROUND

Openings such as joints, voids, gaps, or other discontinuities between two or more adjacent structural elements are present in buildings to accommodate building movements. Movements can occur between the adjacent structural elements, for example due to loads, heat, wind, and seismic events. These openings are sometimes referred to as dynamic joints, since they change (expand and contact or flex) over time.

There is a growing emergence of building codes and design guidelines specifying a minimum Sound Transmission Class (STC) rating within a building. There are also guidelines in international building codes for smoke partitions and smoke barriers. The openings within building structures can act as conduits for the passage of sound and smoke within commercial structures (e.g., apartments, office buildings, schools, etc.).

SUMMARY

There is a desire to identify alternative smoke and sound barriers for treating building joints, which may allow advantages in ease of use, range of use, and/or aesthetics.

In one aspect, use of a non-porous adhesive article to provide a smoke and sound barrier joint system is described, wherein the smoke and sound barrier joint system comprises a first structural element having a first attachment area and a second structural element having a second attachment area, the first and second structural elements being moveable with respect to one another, the first and second attachment areas defining a space therebetween, the space having a fixed length and a width which varies from a minimum width to a maximum width as the structural elements move with respect to each other, wherein the non-porous adhesive article is fixedly attached to the first attachment area and the second attachment area and the space, optionally comprises a packing material.

In another aspect, a smoke and sound barrier joint system is described comprising
(a) a non-porous adhesive article comprising a substrate and an adhesive disposed on a first major surface of the substrate;
(b) an optional packing material; and
(c) a structure having a joint, the joint including a first structural element having a first attachment area and a second structural element having a second attachment area, the first and second structural elements being moveable with respect to one another, the first and second attachment areas defining a space therebetween, the space having a fixed length and a width which varies from a minimum width to a maximum width as the structural elements move with respect to each other, wherein the space optionally comprises the packing material and wherein the adhesive is fixedly attached to the first attachment area and the second attachment area.

In yet another aspect, a method of attaching a smoke and sound barrier to a dynamic joint in a structure is described, the dynamic joint including a first structural element having a first attachment area and a second structural element having a second attachment are, the first and second structural elements being moveable with respect to one another, the first and second attachment areas defining a space therebetween, the space having a fixed length and a width which varies from a minimum width to a maximum width as the structural elements move with respect to each other, the method for attaching comprising the step of: (a) optionally filling the space with a packing material; and (b) fixedly attaching a non-porous adhesive article comprising a substrate and an adhesive disposed on a first major surface of the substrate such that the adhesive contacts over the first attachment area and the second attachment area to form a smoke and sound barrier joint system.

The above summary is not intended to describe each embodiment. The details of one or more embodiments of the invention are also set forth in the description below. Other features, objects, and advantages will be apparent from the description and from the claims.

BRIEF DESCRIPTION OF THE DRAWINGS

Shown in FIG. 1 is a side-view of one side of a wall comprising an exemplary joint system of a wall-to-wall joint disclosed herein.

Shown in FIG. 2 is a side-view of a gypsum wall comprising an exemplary joint system disclosed herein.

Figure 3:
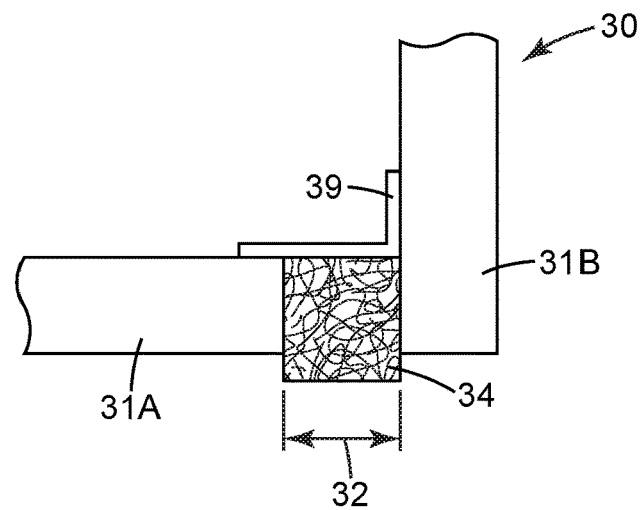

Shown in FIG. 3 is a side-view of one side of a wall comprising an exemplary joint system of a 90 degree joint disclosed herein.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed toward the treatment of openings between or bounded by two or more adjacent structural elements in a building (also known as a joint) to minimize sound transfer and prevent the spread of smoke. Surprisingly, it has been discovered that by sealing the opening with a non-porous adhesive article, such as a tape, and optionally packing the opening with a packing material, can provide a smoke and sound barrier. As used herein, a smoke and sound barrier means a construction that can prevent the passage of smoke and reduces the transmission of sound.

In one embodiment, the smoke and sound barrier joint system is rated, meaning that it passes an approved regiment of testing. Such tests include: ASTM method E90-04 "Standard Test method for Laboratory measurement of Airborne Sound Transmission Loss of Building Partitions and Elements; ASTM E413-10 "Classification for Rating Sound Insulation" and the UL (Underwriters Laboratory) standard 2079-2008 (R2012) "Standard for Safety Tests for Fire Resistance of Building Joint Systems" which includes an optional air leakage test. Other tests include ASTM E779-10 "Standard Test Method for Determining Air Leakage Rate by Fan Pressurization; and ISO 9972:2006 "Thermal performance of Buildings-Determination of Air Permeability of buildings-Fan Pressurization Method.

The joint systems of the present disclosure comprises the construction assembly, adhesive, and optional packing material. To pass an approved air leakage test (i.e., smoke test) the joint systems of the present disclosure need to withstand a defined temperature profile (for example, exceeding temperatures greater than 200° C.) for a period of time (as described in the standards). In general, for air leakage, the lower the value, the better the smoke resistance.

To achieve an approved sound transmission loss test, the joint systems of the present disclosure need to have a STC rating that meets or exceeds the applicable building code requirements or any architectural requirements to reduce sound transmission. In general, the higher the number for an STC rating, the better the sound reduction properties.

Preferably, the treatment of the joint with the smoke and sound barrier should restore the construction assembly (e.g., wall or floor) back to its original STC rating without the opening. However, different building codes may require that the construction assembly be returned to a portion of the original STC rating. In one embodiment, the smoke and sound barrier of the present disclosure returns the construction assembly back to at least 50, 70, 80, 90, 95, or even 100% of its original STC rating.

In one embodiment, the joint systems of the present disclosure pass a flexibility test, wherein the joint system is expanded and contracted for a given number of cycles. For example, in one embodiment, joints fastened with the adhesive article must pass the tests for movement in dynamic joints as described in ASTM E1399/E1399M-97 (2013) "Standard Test Method for Cyclic Movement and. Measuring the Minimum and Maximum Joint Widths of Architectural Joint Systems".

In one embodiment, the systems of the present disclosure pass ASTM E090-04, E413-10, and UL 2079-2008.

Figure 1:
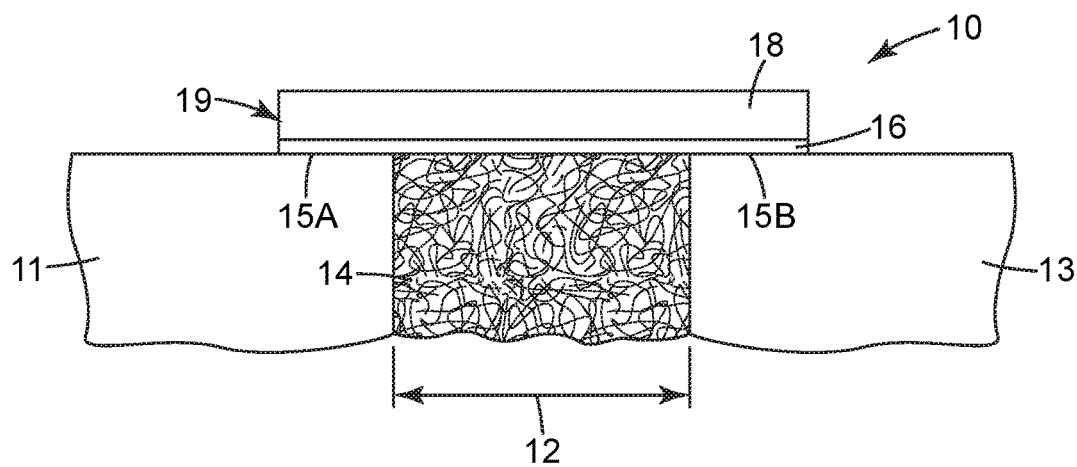

FIG. 1 depicts an exemplary configuration of a joint system of the present disclosure between two parallel elements of one side of a construction assembly (e.g., a wall). First structural element 11 and second structural element 13 have a space (i.e., opening) 12 therebetween. Space 12 is at least partially filled with optional packing material 14. Non-porous adhesive article 19 is applied over space 12, wherein the non-porous adhesive article is fixedly attached via adhesive 16 to first attachment area 15A and second attachment area 15B.

Shown in FIG. 1 is a opening between two parallel structural elements (e.g., wall-to-wall or floor-to-floor), however, the opening can also occur between structural elements that are approximately at a ninety degree angle with respect to one another, such as joints between floor-to-wall or head-of-wall.

Typically the structural elements are capable of moving independently of one another. Thus the size of space 12 can vary as the first structural element flexes relative to the second structural element due to thermal changes, wind, seismic activity, etc. The space between the structural elements is often referred to as a linear opening, because the length of the opening is at least 10 times greater than the width of the opening. The width of the opening may vary from its nominal joint width (i.e., the specified or installation width) ranging from a minimum joint width to a maximum joint width. The nominal width of the joint can vary depending of where the joint is located, for example, in the interior or the perimeter of the construction, with the perimeter wall generally having a larger nominal width. In one embodiment, a nominal width is at least 0.125, 0.25, 0.5, 0.75, 0.825, or even 1 inch (3.1, 6.4, 12.7, 19, 21, or even 25.4 mm); and at most 2, 3, 4, or even 5 inches (50.8, 76.2, 101.6, or even 127 mm), having a compression/expansion of at least 1%, 2%, 5%, or even 7%; and at most 20%, 25%, 30%, 40%, 50%, or even 55% of the nominal width. For example, if the nominal width is 1 inch, a compression/expansion at 25% would be 0.75 inches in compression to 1.25 inches in expansion. In one embodiment, e.g., a perimeter wall, the nominal width is at least 2, 3, or even 5 inches (50.8, 76.2, or even 127 mm); and at most 8, 9, 10, or even 11 inches (203, 229, 254, or even 279 mm), having a compression/expansion of at least 1%, 2%, 5%, or even 7%; and at most 20%, 25%, 30%, 40%, 50%, or even 55% of the nominal width.

It is an objective of the present disclosure that the joint system provides a smoke and sound barrier. In one embodiment, the joint system of the present disclosure passes a sound transmission reduction test such that the joint system meets the desired rating. It is also an objective in the present disclosure that in one embodiment, the adhesive article seals the opening and that the seal not be compromised during the shifting of the first and second structural elements relative to one another thus, acting to prevent transmission of smoke during, e.g., a fire.

The joints disclosed herein occur in building constructions, thus, the non-porous adhesive article of the present disclosure is fixedly attached to structural elements made of construction materials such as gypsum wallboard (i.e., sheetrock), metal (e.g., steel, aluminum), cement (e.g., Portland cement concrete), concrete, mortar, masonry (e.g., brick and cement blocks), wood, plastics, and combinations thereof.

Optionally, in one embodiment of the present disclosure, a packing material is installed into the opening. The packing material can include materials known in the art to reduce sound transmission such as synthetic and non-synthetic material including glass fiber, ceramic fiber, mineral fiber (also known as mineral wool, basalt, or rock wool), intumescent and endothermic packing materials, foams including open cell and closed cell foams such as backer rods, and combinations thereof. These materials may be used as fabrics, mats, bats, sheets, or loose fill.

Exemplary ceramic fibrous materials include ceramic oxide fibers such as small diameter melt-blown aluminosilicate ceramic fibers commercially available, for example, under the trade designations "FIBERFRAX DURABACK BLANKET" from Carborundum Co. of Niagara Falls, N.Y., and aluminosilicate fibers commercially available, for example, under the trade designations "CERAWOOL" and "KAOWOOLII" from Thermal Ceramics of Augusta, Ga.; and ceramic oxide fibers commercially available, for example, from the 3M Company under the trade designation "NEXTEL" (e.g., aluminosilicate ceramic oxide fibers, aluminoborosilicate ceramic oxide fibers commercially available under the trade designation "NEXTEL 312", and alumina ceramic oxide fibers commercially available under the trade designation "NEXTEL 610"). Exemplary mineral wool (such as, mineral wool derived from blast furnace slag having the major components silica, calcia, alumina, and magnesia) include those available, for example, under the trade designation "THERMOFIBER" from U.S. Gypsum of Chicago, Ill. Exemplary blends include, for example, a blend of mineral wool and glass fiber available under the trade designation "3M Fire Barrier Packing Material PM4" available from 3M Co., St. Paul, Minn.

In one embodiment the packing material is free of intumescent materials and/or from endothermic materials. In another embodiment, the packing material is constructed from intumescent materials or from endothermic materials. Intumescent materials are materials that when exposed to heat or flames, expand typically at exposure temperatures above about 200° C., and serve as a barrier to heat, smoke, and flames. Exemplary intumescent material include polymeric binders, fillers, and intumescent particles (e.g., silicates, expanding graphite, and vermiculite) such as those known in the art. Endothermic materials absorb heat and are used to shield construction components from the effects of high temperatures. Useful endothermic mat materials are available, for example, under the trade designation "INTERAM MAT E-5" from 3M Co. St. Paul, Minn. These high temperature resistant materials are generally sufficiently flexible to conform to complex shapes and to conform to dimensional changes due to movement in a dynamic joint.

The packing material of the present disclosure can have resilient properties which permit the material to be pressure fit in the joint. Typically, the packing material is installed in compression (e.g., 50% compression) to maximize fiber density and prevent loss of fit due to e.g., sagging or slipping.

In one embodiment, when filling the joint space, the packing material is added such that it is in a compressed state at the space's nominal width. The packing material is used to enhance the sound reduction values. The depth of packing (i.e., the distance the packing material fills beginning from the first outer surface and extending into the wall cavity), and the type of material used can impact the efficiency of the reduction as is known in the art. The joint space can be packed with the packing material at its full depth (i.e., the entire length between the two walls such as in FIG. 2) for maximum sound rating (e.g., most reduction in sound transmission) or a fraction thereof, which may result in a higher sound (e.g., STC) rating.

The adhesive article of the present disclosure is a multi-layer article comprising a substrate and an adhesive thereon. Other layers as known in the adhesive art may be present, such as a primer layer between the substrate and the adhesive and/or a coating (e.g., ink or low-adhesive backsizing) located on the second major surface of the substrate, opposite the adhesive layer, which is located on the first major surface of the substrate.

Adhesive materials useful in the present disclosure include those that allow adhesion to a variety of construction surfaces, including, for example, concrete, metal (e.g., aluminum or steel), and gypsum wallboard. Adhesive materials suitable for the practice of the present invention include silicones, acrylics, poly alpha olefins, ethylene/vinyl acetate, urethanes, and natural or synthetic rubbers. In one embodiment, the adhesive is a pressure sensitive adhesive.

Suitable urethane resins include polymers made from the reaction product of a compound containing at least two isocyanate groups (—N═C═O), referred to herein as "isocyanates", and a compound containing at least two active-hydrogen containing groups. Examples of active-hydrogen containing groups include primary alcohols, secondary alcohols, phenols, and water. A wide variety of isocyanate-terminated materials and appropriate co-reactants are well known, and many are commercially available for example, polyurethane dispersion based PSA's from Dow Chemical Co. Also see, for example, Gunter Oertel, "Polyurethane Handbook", Hanser Publishers, Munich (1985)).

In one embodiment, active-hydrogen compounds containing primary and secondary amines can react with an isocyanate to form a urea linkage, thereby making a polyurea.

Suitable acrylic resins include acrylic pressure sensitive adhesives (PSAs). Acrylic PSAs comprise polymers of one or more (meth)acrylate ester monomers, which are monomeric (meth)acrylic esters of a non-tertiary alcohol, wherein the alcohol contains from 1 to 20 carbon atoms and preferably an average of from 4 to 14 carbon atoms.

Examples of monomers suitable for use as the (meth)acrylate ester monomer include the esters derived from either acrylic acid or methacrylic acid and non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 3,7-dimethylheptanol, 1-decanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof. In one embodiment, the (meth)acrylate ester monomer is present in an amount of 80 to 99 parts by weight based on 100 parts total monomer content used to prepare the polymer. Preferably (meth)acrylate ester monomer is present in an amount of 90 to 95 parts by weight based on 100 parts total monomer content.

The (meth)acrylic polymer further comprises a polar comonomer. For example, an acid group-containing comonomer. Examples of suitable acid-group containing monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl (meth)acrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In one embodiment, the acid functional monomer is generally used in amounts of 0 to 10 parts by weight, preferably 1 to 5 parts by weight, based on 100 parts by weight total monomer.

Other polar monomers may also be polymerized with (meth)acrylate ester monomer to form the polymer. Representative examples of other suitable polar monomers include but are not limited to 2-hydroxyethyl (meth)acrylate; N-vinylpyrrolidone; N-vinylcaprolactam; acrylamide; mono- or di-N-alkyl substituted acrylamides, such as for example t-butyl acrylamide, dimethylaminoethyl acrylamide, and N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth) acrylate, 2-methoxyethyl methacrylate, polyethylene glycol mono(meth)acrylates and mixtures thereof. Exemplary polar monomers include those selected from the group consisting of 2-hydroxyethyl (meth)acrylate and N-vinylpyrrolidone. In one embodiment, the other polar monomer may be present in amounts of 0 to 10 parts by weight, preferably 1 to 5 parts by weight, based on 100 parts by weight total monomer.

When used, vinyl monomers useful in the (meth)acrylate polymer include: alkyl vinyl ethers (e.g., vinyl methyl ether); vinyl esters (e.g., vinyl acetate and vinyl propionate), styrene, substituted styrene (e.g., α-methyl styrene), vinyl halide, and mixtures thereof. Such vinyl monomers are generally used at 0 to 5 parts by weight, preferably 1 to 5 parts by weight, based on 100 parts by weight total monomer.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylate include, but are not limited to, di(meth) acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth) acrylate, and mixtures thereof. The amount and identity of multifunctional (meth)acrylate is tailored depending upon application of the adhesive composition. Typically, the multifunctional (meth)acrylate is present in amounts less than 5 parts based on based on 100 parts by weight total monomer. In one embodiment, the multifunctional (meth)acrylate may be present in amounts from 0.01 parts to 1 part based on 100 parts total monomers of the adhesive composition.

Optional co-monomers can be used to tailor the performance of the PSA. Optional co-monomers include those having at least two different reactive groups e.g., 2-OH (meth) acrylate and glycidyl (meth)acrylate.

In one embodiment, the (meth)acrylic polymer can be crosslinked with thermal cross-linking agents, which are activated by heat, and/or photosensitive crosslinking agents, which are activated by ultraviolet (UV) light. Useful photosensitive cross-linking agents include: multifunctional (meth)acrylates, triazines, and combinations thereof. Exemplary crosslinking agents include substituted triazines such as 2,4,-bis(trichloromethyl)-6-(4-methoxy phenyl)-s-triazine, 2,4-bis(trichloromethyl)-6-(3,4-dimethoxyphenyl)-s-triazine, and the chromophore-substituted halo-s-triazines disclosed in U.S. Pat. Nos. 4,329,384 and 4,330,590 (Vesley). Various other crosslinking agents with different molecular weights between (meth)acrylate functionality may also be useful.

In one embodiment, glycidyl (meth)acrylate may be used as a thermal crosslinking agent to provide functionality which can be activated upon or after application in the field. For example, when the adhesive article is exposed to an elevated temperature, (e.g., a fire) the epoxy group of the glycidyl (meth)acrylate may react to provide further crosslinking, which can further increase the cohesive strength and increase the temperature resistance.

Suitable silicone resins include moisture-cured silicones, condensation-cured silicones, and addition-cured silicones, such as hydroxyl-terminated silicones, silicone rubber, and fluoro-silicone. Examples of suitable commercially available silicone PSA compositions comprising silicone resin include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. An example of a two-part silicone resin is commercially available under the trade designation "SILASTIC J" from Dow Chemical Company, Midland, Mich.

Pressure sensitive adhesives (PSAs) can include natural or synthetic rubbers such as styrene block copolymers (styrene-butadiene; styrene-isoprene; styrene-ethylene/butylene block copolymers); nitrile rubbers, synthetic polyisoprene, ethylene-propylene rubber, ethylene-propylene-diene monomer rubber (EPDM), polybutadiene, polyisobutylene, butyl rubber, styrene-butadiene random copolymers, and combinations thereof.

Additional pressure sensitive adhesive include poly(alpha-olefin), polychloroprene, silicone elastomers. In some embodiments, polychloroprene and silicone elastomers may be preferred since polychloroprene contains a halogen, which can contribute towards flame resistance, and silicone elastomers are resistant to thermal degradation.

In one embodiment, the pressure sensitive adhesives may also contain one or more conventional additives. Preferred additives include tackifiers, plasticizers, flame retardants, foaming agents, dyes, antioxidants, and UV stabilizers.

In some embodiment, a tackifing agent maybe required to provide the desired adhesive characteristics. Styrene block copolymers or (meth)acrylic polymers may include a suitable tackifying resin. Suitable tackifiers include rosin acids, rosin esters, terpene phenolic resins, hydrocarbon resins, and cumarone indene resins. The type and amount of tackifier can affect properties such as tack, bond strength, heat resistance, and specific adhesion. Exemplary tackifiers include: hydrogenated hydrocarbons available under the trade brands "REGALITE" and "REGALREZ", by Eastman Chemical Co., Middelburg, Netherlands; and "ARKON" by Arakawa Chemical Inc., Chicago, Ill.; glycerin rosin ester available under the trade designation "FORAL 85" from Eastman Chemical Co., Kingsport, Tenn.; hydrocarbon or rosin types are available under the series "ESCOREZ" from ExxonMobil Chemical, Houston, Tex.; hydrocarbon resins available under the series trade designation "WINGTACK" from Cray Valley, Exton, Pa.; and terpene phenolic tackifiers available under the trade designation "SYLVARES TP96" from Arizona Chemical, Jacksonville, Fla.

In one embodiment, the PSA may contain a plasticizer, which can help soften the adhesive, and as a result, the structural element is more easily wetted by the adhesive. Further, the use of a plasticizer may improve the adhesive properties, including peel. The plasticizer may be hydrophobic and/or hydrophilic.

In one embodiment, the pressure sensitive adhesive is selected from at least one of an acrylic copolymer and a tackified styrene block copolymer.

The adhesive should have such properties that allow the adhesive article to move as the structural elements move with respect to one another. For example, in one embodiment, joints fastened with the adhesive article must pass the tests for movement in dynamic joints as described in ASTM E1399/E1399M-97 (2013) "Standard Test Method for Cyclic Movement and Measuring the Minimum and Maximum Joint Widths of Architectural Joint Systems".

In one embodiment, the adhesive has a 90° peel strength according to ASTM D6252/6252M-98 (2011) at a strain rate of 12 inches/minute of at least 0.4, 0.5, 0.7, 0.8, 1, 1.5, or even 2 lb/in on the structural element such as gypsum wallboard and/or concrete. However, the acceptable peel strength can be dependent upon the overlap (or attachment area) of the adhesive article to the construction material. For example, with larger adhesive overlaps, lower peel strengths may be acceptable; whereas with smaller attachment overlaps, higher peel strengths may be necessary.

In one embodiment, the adhesive is disposed on at least one major surface of a substrate. In one embodiment, the adhesive is a continuous layer across the first major surface of the substrate, wherein the adhesive covers at least 20, 40, 50, 70, 80, 90, 99, or even 100% of one major surface of the substrate. The adhesive is applied at a thickness sufficient to adhere the adhesive article to a building's structural elements. The thickness of the adhesive typically ranges from about 2 mil (50 micrometers) to about 30 mil (762 micrometers). A thick layer of adhesive material may be desirable for some applications, for example so that the adhesive material conforms to an irregular surface of the structural element (e.g., concrete). Preferably, the adhesive forms a layer with sufficient adhesion between the adhesive article and the structural element. The time required for the adhesion to develop may vary due to humidity and/or ambient temperature.

The substrate of the adhesive article may be selected from a polymeric film, a paper, a nonwoven matrix, a woven matrix, a metallic sheet, a foam, and combinations thereof. Exemplary substrates include polyolefins such as polyethylene, polypropylene (including isotactic polypropylene), polystyrene, polyester (such as poly(ethylene terephthalate) and poly(butylene terephthalate), polyvinyl alcohol, poly (caprolactam), poly(vinylidene fluoride), polylactides, cellulose acetate, and ethyl cellulose and the like. Commercially available backing materials useful include Kraft paper (available from Monadnock Paper, Inc.); cellophane (available from Flexel Corp.); spun-bond poly(ethylene) and poly(propylene), available under the trade designation "TYVEK" and "TYPAR" (available from DuPont, Inc.); and porous films obtained from poly(ethylene) and poly(propylene), available under the trade designation "TESLIN" (available from PPG Industries, Inc.), and "CELLGUARD" (available from Hocchst-Celanese).

The substrate can be selected based on the application. The substrate should be stable (i.e., does not auto-ignite or distort) at temperatures of at least 80° C., 85° C., 90° C., 93° C., 95° C., 98° C., 100° C., 150° C., 180° C., or even 200° C. In one embodiment, the substrate has some flexibility allowing the adhesive article to absorb some of the movement between the two structural elements. In one embodiment, a polyolefin substrate is selected due to its resistance to humidity changes, as opposed to a paper backing, which may be preferred from a lifetime durability standpoint.

The adhesive article of the present disclosure is non-porous. The Gurley second or Gurley unit is a unit describing the number of seconds required for 100 cubic centimeters (1 deciliter) of air to pass through 1.0 square inch of a given material at a pressure differential of 4.88 inches of water. The lower the Gurely second, the more porous the material. In one embodiment, the adhesive article has a Gurely value of greater than 1, 2, 4, 5, 10, 20, 40, or even 60 Gurley seconds. It is believed that the non-porosity of the adhesive article is important for sealing of the joint assembly, preventing air and gas passage. In one embodiment, the joint system comprising the smoke and sound barrier has a leakage rate of less than 1 CFM/linear foot as per UL 2079-2008, where CFM is cubic feet per min.

In one embodiment, the adhesive article can be used in a roll format, sheet, or a die cut shape. In one embodiment, the adhesive article comprises a liner, which is removed from the adhesive side of the adhesive article prior to application to the structural elements.

In the present disclosure, after filling space 12 with the optional packing material, adhesive article 19 is placed over the space, flush with structural elements 11 and 13, forming the joint system. In one embodiment, the adhesive of the adhesive article contacts the optional packing material.

The adhesive article should sufficiently overlap the structural elements to maintain contact with the structural elements and maintain a seal over the lifetime of the joint. In one embodiment, the adhesive article overlaps the opening by at least 0.125, 0.25, 0.5, 0.75, 1, 2, or even 4 inches (3.2, 6.4, 12.7, 19, 25.4, 50.8, or even 101.6 mm) on either side; and at most 6 or even 12 inches (152.4, or even 304.8 mm). In other words, the adhesive article contacts the first attachment area by at least 0.25 inches. The acceptable overlap of the adhesive article with the attachment areas can depend on the nature of the structural element (e.g., concrete versus gypsum); adhesive used (e.g., the 90 degree peel strength as mentioned above); and/or the flexibility of the substrate (e.g., more overlap needed for substrates that are not as flexible), as can be seen in the Example Section below.

Heretofore the means for sealing such joints has been to insert an insulation batting or to spray foam, putty, or caulk into the joint gap. Using an adhesive article as disclosed herein for a smoke and sound barrier has advantages over the putties, caulk and spray coating, including the ability to use over a broader working range (for example, at temperatures below 4° C. and in wet conditions) with little preparation of the structural elements, and ease of use (i.e., rolling a strip of tape down a wall wherein the adhesive is contained up the adhesive substrate).

As shown in FIG. 1, the adhesive article of the present disclosure is fixedly attached to the first and second structural elements, such that the adhesive article is flush against the wall in a wall-to-wall or floor-to-floor joint. Shown in FIG. 3, is an exemplary embodiment of the joint assembly of the present disclosure in a joint formed by two structural elements approximately at 90 degrees from one another, such as in wall-to-floor or head-of-wall joint. First structural element 31A is approximately at 90 degrees from second structural element 31B, forming space 32. The optional packing material 34 fills space 34 and adhesive article 39 is fixedly attached to both structural elements forming assembly 30.

As seen in both FIGS. 1 and 3, the adhesive article is attached to the outer surface of the wall (or floor) and the adhesive article maintains a distance from the outer surface of the wall which is nominally the thickness of the tape. Typical thickness of the adhesive articles of the present disclosure have a thickness of 50 micrometers to about 1 millimeter. Advantageously, if the joints disclosed herein occur on a visible wall, the fathering of the joint can be minimized due to the thinness of the adhesive article as compared to other smoke and sound barrier systems to joints.

Figure 2:
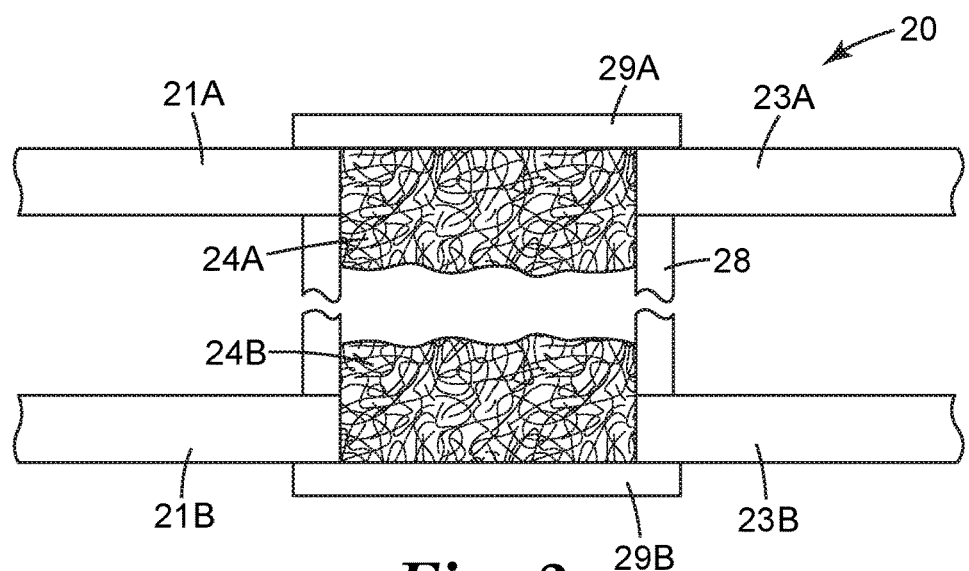

Typically the smoke and sound barrier of the present disclosure is applied to both sides of the wall (or floor) to provide maximum results. Shown in FIG. 2 is one embodiment of the present disclosure, depicting a gypsum wall comprising two sides. The first side of the wall comprises structural elements 21A and 23A, wherein packing material 24A and adhesive article 29A are used to seal the opening on Side A and packing material 24B and adhesive article 29B are used to seal the opening of Side B formed by structural elements 21B and 21B. Although not wanting to be limited by theory, it is believed that the presence of the packing material aides in reducing sound transmission, helping to restore the construction assembly more closely back to its original rating. Although not wanting to be limited by theory, it is believed that the adhesive article 29A and 29B act as a non-porous barrier, minimizing a stack effect (i.e., movement of air resulting from pressure, temperature, and/or moisture differences). These stack effects can lead to potential spreading of smoke from one area to another throughout the building.

It has been discovered that optionally packing the opening with a packing material and sealing with a non-porous adhesive article, such as a tape, provides a smoke and sound barrier. The smoke and sound barrier must also have the ability to flex with building movement and have long term durability (e.g., 20 years, 30 years or even 40 years). Furthermore, construction sites are typically thought of as dirty, with dust, dirt, etc. In one embodiment, the adhesive articles disclosed herein can be applied to the first and second structural elements without clean-up or priming of the structural elements. Still further, in one embodiment, the adhesive articles disclosed herein can be applied to water saturated structural elements such as cement concrete and still fixedly attach to the structural element.

Exemplary embodiments which are useful for understanding the present disclosure include the following.

Embodiment 1. Use of a non-porous adhesive article and optionally a packing material to provide a smoke and sound barrier joint system, wherein the smoke and sound barrier joint system comprises a first structural element having a first attachment area and a second structural element having a second attachment area, the first and second structural elements being moveable with respect to one another, the first and second attachment areas defining a space therebetween, the space having a fixed length and a width which varies from a minimum width to a maximum width as the structural elements move with respect to each other, wherein the non-porous adhesive article is fixedly attached to the first attachment area and the second attachment area and the space optionally comprises a packing material.

Embodiment 2. The use as in embodiment 1, wherein the non-porous adhesive article comprises a continuous layer of adhesive selected from at least one of an epoxy, an acrylic, a urethane, a silicone, and a rubber.

Embodiment 3. The use as in of any one of the previous embodiments, wherein the adhesive is a pressure sensitive adhesive.

Embodiment 4. The use as in of any one of the previous embodiments, wherein the adhesive comprises at least one of (i) an acrylic adhesive and (ii) a styrene block copolymer and a tackifier.

Embodiment 5. The use as in any one of the previous embodiments, wherein the substrate is selected from at least one of a polymeric film, a paper, a nonwoven matrix, a woven matrix, a metallic sheet, and a foam.

Embodiment 6. The use as in any one of the previous embodiments, wherein the packing material is selected from at least one of mineral fiber, glass fiber, ceramic fiber, and foam.

Embodiment 7. The use as in any one of the previous embodiments, wherein the space has a nominal width of at least 3.2 mm.

Embodiment 8. The use as in any one of the previous embodiments, wherein the space has a nominal width of at least 50.8 mm.

Embodiment 9. The use as in any one of the previous embodiments, wherein the first structural element is selected from at least one of cement, gypsum, wood, metal, and plastic.

Embodiment 10. The use as in any one of the previous embodiments, wherein the second structural element is selected from at least one of cement, gypsum, wood, metal, and plastic.

Embodiment 11. A smoke and sound barrier joint system comprising
   (a) a non-porous adhesive article comprising a substrate and an adhesive disposed on a first major surface of the substrate;
   (b) an optional packing material; and
   (c) a structure having a joint, the joint including a first structural element having a first attachment area and a second structural element having a second attachment area, the first and second structural elements being moveable with respect to one another, the first and second attachment areas defining a space therebetween, the space having a fixed length and a width which varies from a minimum width to a maximum width as the structural elements move with respect to each other,
wherein the space optionally comprises the packing material and wherein the adhesive is fixedly attached to the first attachment area and the second attachment area.

Embodiment 12. The smoke and sound barrier joint system of embodiment 11, wherein the non-porous adhesive article comprises a continuous layer of adhesive selected from at least one of an epoxy, an acrylic, a urethane, a silicone, and a rubber.

Embodiment 13. The smoke and sound barrier joint system of any one of embodiments 11-12, wherein the adhesive is a pressure sensitive adhesive.

Embodiment 14. The smoke and sound barrier joint system of any one of embodiments 11-13, wherein the adhesive comprises at least one of an acrylic adhesive and a styrene block copolymer and a tackifier.

Embodiment 15. The smoke and sound barrier joint system of any one of embodiments 11-14, wherein the substrate is selected from at least one of a polymeric film, a paper, a nonwoven matrix, a woven matrix, a metallic sheet, and a foam.

Embodiment 16. The smoke and sound barrier joint system of any one of embodiments 11-15, wherein the packing material is selected from at least one of mineral fiber, ceramic fiber, glass fiber, and foam.

Embodiment 17. The smoke and sound barrier joint system of any one of embodiments 11-16, wherein the first structural element is selected from at least one of cement, gypsum, wood, metal, and plastic.

Embodiment 18. The smoke and sound barrier joint system of any one of embodiments 11-17, wherein the second structural element is selected from at least one of cement, gypsum, wood, metal, and plastic.

Embodiment 19. The smoke and sound barrier joint system of any one of embodiments 11-18, wherein an assembly comprising the first structural element and the second structural element with no space therebetween has an original STC rating; wherein the smoke and sound barrier joint system has a second STC rating; and wherein the second STC rating is at least 50% of the original rating.

Embodiment 20. The smoke and sound barrier joint system of any one of embodiments 11-18, wherein the smoke and sound barrier joint system has an air leakage rating of less than 10 CFM/linear foot.

Embodiment 21. A method of attaching a smoke and sound barrier to a dynamic joint in a structure, the dynamic joint including a first structural element having a first attachment area and a second structural element having a second attachment area, the first and second structural elements being moveable with respect to one another, the first and second attachment areas defining a space therebetween, the space having a fixed length and a width which varies from a minimum width to a maximum width as the structural elements move with respect to each other, the method for attaching comprising the step of:

(a) optionally filling the space with a packing material; and
(b) fixedly attaching a non-porous adhesive article comprising a substrate and an adhesive disposed on a first major surface of the substrate such that the adhesive contacts over the first attachment area and the second attachment area to form a smoke and sound barrier joint system.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available or known to those skilled in the art unless otherwise stated or apparent.

The following abbreviations are used: cm=centimeter; in=inch; lbs=pounds; mm=millimeter; m=meter; and ft=foot.

Materials Table

| Material | Description |
|---|---|
| Tape 4016 | A tape available under the trade designation "3M DOUBLE COATED URETHANE FOAM TALE 4016" $1/16$ inch (1.6 mm) thick |
| Tape 4466 | A tape available under the trade designation "3M DOUBLE COATED POLYETHYLENE FOAM TAPE 4466" $1/16$ inch (1.6 mm) thick |
| Tape 4516 | A tape available under the trade designation "3M VINYL FOAM TAPE 4516" $1/16$ inch (1.6 mm) thick |
| Tape 8067 | An acrylic pressure sensitive adhesive tape available under the trade designation "3M ALL-WEATHER FLASHING TAPE 8067" from 3M Co., with a tape thickness of (0.0099 in) 0.25 mm with a backing thickness of (0.005 in) 0.13 mm. |
| Tape 5490 | A polytetrafluoroethylene tape available under the trade designation "3M PTFE FILM TAPE 5490" from 3M Co. |

Test Methods

Sound Testing

Samples were tested according to ASTM E90-04 "Standard Test Method for Laboratory Measurement of Airborne Sound Transmission Loss of Building Partitions and Elements" and ASTM E413 "Classification for Rating Sound Insulation". The wall consisted of a sealed slotted wall panel 1.21 m (47.50 in.) wide by 2.43 m (95.50 in.) high and 254.0 mm (10.0 in.) thick. The wall comprised three voids that were nominally 12.7 mm (0.50 in.) wide, which extended through the wall. The finished wall assembly was tested in a 1.22 m (4.0 ft.) by 2.44 m (8.0 ft.) test opening and was sealed on the periphery (both sides) with dense mastic. The source room temperature at the time of the test was 21±0° C. (70±0° F.) and 52±1% relative humidity. The receiving room temperature at the time of the test was 21±0° C. (70±0° F.) and 50±1% relative humidity. The source and receive reverberation room volumes were 178 $m^3$ (6,298 $ft^3$) and 139 $m^3$ (4,924 $ft^3$), respectively. The transmission area used in the calculations was 2.9 $m^2$ (31.5 $ft^2$).

Leakage Testing

Leakage Testing was conducted according to UL 2079-2008 (R2012), wherein the assembly is exposed to elevated temperatures (e.g., a controlled fire). According to UL 2079, the installation must show no tears or loss of adhesion (in other words, maintain integrity) to the construction assembly in order to pass. If any tears or loss of adhesion to the structural elements are noted, this section of the testing fails.

Peel Adhesion Test

The 90 degree peel adhesion test was performed similarly to ASTM D6252/6252M-98 (2011) "Standard Test Method for Peel Adhesion of Pressure-Sensitive Label Stocks at a 90° Angle". The adhesive articles were cut into 1 in (2.54 cm) wide strips. Testing differed from the ASTM D6252/6252M in that the testing surface (i.e., the gypsum wallboard) was wiped clean with only a cloth, and the strips of tape were adhered by hand strength to the stated construction assembly material with a rubber roller. Less than a 60 sec dwell time was allowed, and the sample was measured for 90 degree peel adhesion at a speed of 12 in/min. Results are reported in lbs/in.

Sound Testing Example

A wall was built to have an STC rating of 54. The testing wall comprised a Side A and a Side B with 3 voids therethrough. Each of the voids was treated identically per sample and the wall was then tested by the Sound Test Method above for its STC rating. In sample 1, neither side of the voids were treated. In samples 3, 5, 7, 9 and 11, only one side of the voids was treated with an adhesive article, liner removed if present, as shown in Table 1. In samples 2, 4, 6, 8, 10, and 12 both sides of the voids were treated with an adhesive article, liner removed if present, as shown in Table 1. In samples 3-6, a packing material was used to fill the 0.5 inch voids. In samples 3-4, a 0.5 in (12.7 mm) wide and 0.5 inch (12.7 mm) in length piece of backer rod (cut from model 71480 0.5 in by 20 feet long caulk backer rod from MD Building Products, Oklahoma City, Okla.) was used to fill the voids. In samples 5-6, 0.75 in (19 mm) wide and 2 in (51 mm) length piece of mineral wool (Roxul Inc. Ontario, Canada) was compressed and placed into the voids, having a 2 in depth. The results are shown in Table 1

TABLE 1

| Sample | Side A | Side B | Packing Material | STC Rating |
|---|---|---|---|---|
| 1 | none | none | none | 20 |
| 2 | Tape 8067 | Tape 8067 | none | 43 |
| 3 | Tape 8067 | none | Backer rod | 40 |
| 4 | Tape 8067 | Tape 8067 | Backer rod | 54 |
| 5 | Tape 8067 | none | mineral wool | 53 |
| 6 | Tape 8067 | Tape 8067 | mineral wool | 54 |
| 7 | Tape 4016 | none | none | 33 |
| 8 | Tape 4016 | Tape 4016 | none | 47 |
| 9 | Tape 4466 | none | none | 31 |
| 10 | Tape 4466 | Tape 4466 | none | 41 |
| 11 | Tape 4516 | none | none | 37 |
| 12 | Tape 4516 | Tape 4516 | none | 52 |

Leakage Testing Example

Two gypsum walls were constructed in the manner described in the individual U400-Series Wall or Partition Design in the UL Fire Resistance Directory (2014) and included the following construction features: Wall framing consisted of steel channel studs. Steel studs were a minimum 3-5/8 in. (92 mm) wide by 1-1/4 in. (32 mm) deep with a minimum 25 gauge steel channels. Steel stud spacing was a maximum of 24 in. (610 mm) on center. Two layers 5/8 in. (16 mm) thick gypsum wallboard, as specified in the individual U400-Series Design were used on each side of the wall.

A wall assembly was constructed with two gypsum walls (16 in (406 mm) by 35 in (889 mm)) having a 2 inch (51 mm) width by 35 in (889 mm) linear opening therebetween. The two walls were aligned next to one another with the stated linear joint opening and the assembly was placed into an external metal frame and secured during testing.

An adhesive article was placed over both sides of the joint (fire side and the "cold" side). The adhesive article was placed over the opening, overlapping the gypsum wallboard by a minimum of 2.54 cm (1 in.) on each side of the joint. The adhesive article covered the length of the joint as well. UL 2079 calls out a specific temperature profile for this leakage test with a maximum temperature of 400° F. For this testing, the temperature profile was maintained between 400 and 500° F. for 30 minutes as the furnace used was incapable of maintain a temperature below 400° F. The joint system was tested per the Leakage Testing and the results are shown in Table 3.

A Peel Adhesion Test as described above was performed on Tape 8067 and Tape 5490 on a piece of gypsum wallboard. The results are shown in Table 3 as well.

TABLE 3

| Adhesive Article | Leakage Test | Peel adhesion (lbs/in) |
|---|---|---|
| Tape 8067 | Pass | >2 |
| Tape 5490 | Fail | 0.3 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A method of using a non-porous adhesive article and optionally a packing material to provide a smoke and sound barrier joint system, the method comprising:
   providing a first structural element having a first attachment area and a second structural element having a second attachment area, the first and second structural elements being moveable with respect to one another, the first and second attachment areas defining a space therebetween, the space having a fixed length and a width which varies from a minimum width to a maximum width as the structural elements move with respect to each other;
   optionally packing the space with the packing material; and
   fixedly attaching the non-porous adhesive article to the first attachment area and the second attachment area wherein the non-porous adhesive article comprises a substrate and a pressure sensitive adhesive disposed on at least 90% of a first major surface of the substrate and wherein the non-porous adhesive article has a 90° peel strength according to ASTM D6252/6252M-98 (2011) at a strain rate of 12 inches/minute of at least 2 lb/in on gypsum wallboard.

2. The method of claim 1, wherein the adhesive is selected from at least one of an epoxy, an acrylic, a urethane, a silicone, and a rubber.

3. The method of claim 1, wherein the adhesive comprises at least one of (i) an acrylic adhesive and (ii) a styrene block copolymer and a tackifier.

4. The method of claim 1, wherein the substrate is selected from at least one of a polymeric film, a paper, a nonwoven matrix, a woven matrix, a metallic sheet, and a foam.

5. The method of claim 1, wherein the packing material is selected from at least one of mineral fiber, glass fiber, ceramic fiber, and foam.

6. The method of claim 1, wherein the space has a nominal width of at least 3.2 mm.

7. The method of claim 1, wherein the space has a nominal width of at least 50.8 mm.

8. A smoke and sound barrier joint system comprising
   (a) a non-porous adhesive article comprising a substrate and an adhesive disposed on at least 90% of a first major surface of the substrate;
   (b) an optional packing material; and
   (c) a structure having a joint, the joint including a first structural element having a first attachment area and a second structural element having a second attachment area, the first and second structural elements being moveable with respect to one another, the first and second attachment areas defining a space therebetween, the space having a fixed length and a width which varies from a minimum width to a maximum width as the structural elements move with respect to each other, wherein the space optionally comprises the packing material and wherein the adhesive is a pressure sensitive adhesive which is fixedly attached to the first attachment area and the second attachment area and wherein the non-porous adhesive article has a 90° peel strength according to ASTM D6252/6252M-98 (2011) at a strain rate of 12 inches/minute of at least 2 lb/in on gypsum wallboard.

9. A method of attaching a smoke and sound barrier to a dynamic joint in a structure, the dynamic joint including a first structural element having a first attachment area and a second structural element having a second attachment area, the first and second structural elements being moveable with respect to one another, the first and second attachment areas defining a space therebetween, the space having a fixed length and a width which varies from a minimum width to a maximum width as the structural elements move with respect to each other, the method for attaching comprising the step of:
   (a) optionally filling the space with a packing material; and
   (b) fixedly attaching a non-porous adhesive article comprising a substrate and a pressure sensitive adhesive disposed on at least 90% of a first major surface of the substrate such that the pressure sensitive adhesive contacts over the first attachment area and the second attachment area to form a smoke and sound barrier joint system and wherein the non-porous adhesive article has a 90° peel strength according to ASTM D6252/6252M-98 (2011) at a strain rate of 12 inches/minute of at least 2 lb/in on gypsum wallboard.

10. The smoke and sound barrier joint system of claim 8, wherein the adhesive is selected from at least one of an epoxy, an acrylic, a urethane, a silicone, and a rubber.

11. The smoke and sound barrier joint system of claim 8, wherein the adhesive comprises at least one of an acrylic adhesive and a styrene block copolymer and a tackifier.

12. The smoke and sound barrier joint system of claim 8, wherein the substrate is selected from at least one of a polymeric film, a paper, a nonwoven matrix, a woven matrix, a metallic sheet, and a foam.

13. The smoke and sound barrier joint system of claim 8, wherein the packing material is selected from at least one of mineral fiber, ceramic fiber, glass fiber, and foam.

14. The smoke and sound barrier joint system of claim 8, wherein the smoke and sound barrier joint system has an air leakage rating of less than 10 CFM/linear foot.

15. The smoke and sound barrier joint system of claim 8, wherein an assembly comprising the first structural element and the second structural element with no space therebetween has an original STC rating; wherein the smoke and sound barrier joint system has a second STC rating; and wherein the second STC rating is at least 50% of the original rating.

16. The method of claim 9, wherein the adhesive is selected from at least one of an epoxy, an acrylic, a urethane, a silicone, and a rubber.

17. The method of claim 9, wherein the adhesive comprises at least one of an acrylic adhesive and a styrene block copolymer and a tackifier.

18. The method of claim 9, wherein the substrate is selected from at least one of a polymeric film, a paper, a nonwoven matrix, a woven matrix, a metallic sheet, and a foam.

19. The method of claim 1, wherein the non-porous adhesive article is flush with the first and second structural elements.

20. The method of claim 1, wherein the adhesive is disposed on at least 99% of the first major surface of the substrate.

* * * * *